Feb. 4, 1941.      C. F. BIRD      2,230,606
ARTICLE TIPOVER SIGNAL FOR LEHRS
Filed Nov. 9, 1938
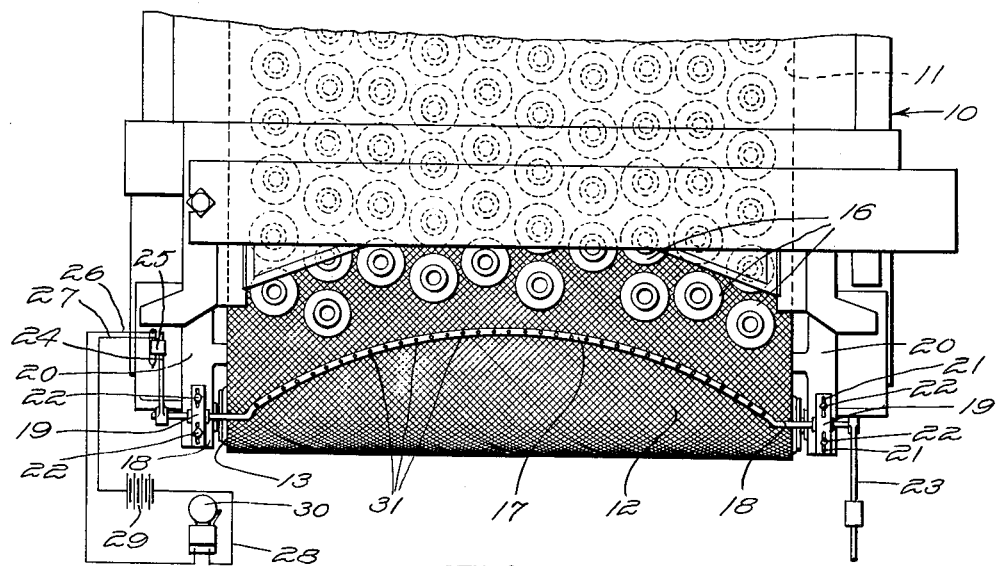
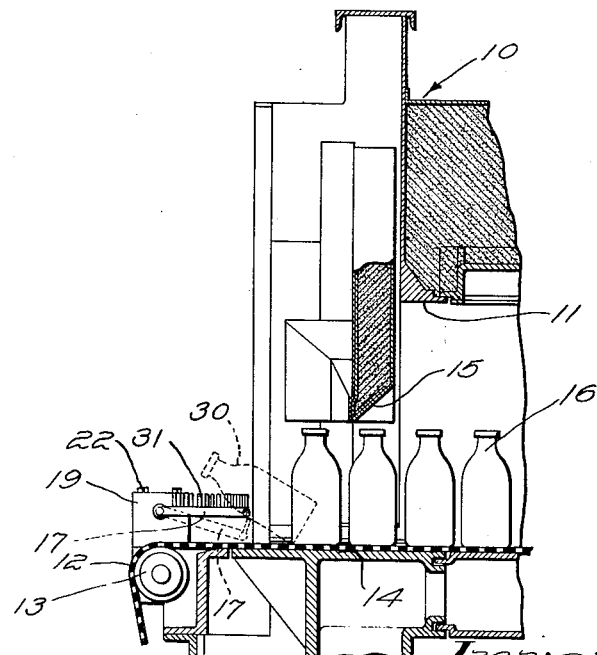
Inventor
Clarence F. Bird
by Brown & Parham
Attorneys
Witness
W. B. Thayer Patented Feb. 4, 1941

2,230,606

UNITED STATES PATENT OFFICE 2,230,606

ARTICLE TIPOVER SIGNAL FOR LEHRS

Clarence F. Bird, Chattanooga, Tenn., assignor to Hartford-Empire Company, Hartford, Conn., a corporation of Delaware Application November 9, 1938, Serial No. 239,619

7 Claims. (Cl. 177—311)

This invention relates to improvements in lehrs which are equipped with automatic ware handling devices, known as stackers, for transferring the articles to be annealed from receiving stations, such as bucks, to the lehr conveyors and for distributing them laterally on the conveyors in predetermined spaced relation with respect to each other.

It is customary, in the operation of lehrs, to employ stackers to effect loading of the lehr conveyors with the ware to be annealed. These stackers operate automatically and space the successive articles on the lehr conveyors by distributing them laterally onto the moving lehr conveyors so that each such lehr conveyor as it moves through the lehr tunnel will carry articles arranged in longitudinal rows with sufficient rows being provided on the conveyor to utilize practically the entire width thereof. The articles are placed on the moving conveyor of a lehr in a zone immediately adjacent to the entrance to the lehr tunnel. Each article thus deposited, unless it is the first article to be deposited on the lehr conveyor at the beginning of operation of the lehr or is in a row next to an edge of the lehr conveyor, is prevented from falling forward or laterally by the adjacent articles but may fall over in a rearward direction, i. e., away from the entrance to the lehr tunnel. If this happens, the article that has fallen on the lehr conveyor will interfere with the subsequent operation of the stacker in that the upset article on the conveyor will cause subsequent articles to tip or fall over and soon cause a condition which may result in loss of considerable glassware. Slight inequalities in the ware supporting surface of the conveyor or any shock, jar or lateral stress imparted to the upper part of an article as it is deposited on a lehr conveyor or soon thereafter may cause it to fall over onto its side, particularly if the article is relatively tall in relation to the area of its base or is easily tiltable for any other reason.

An object of the present invention is to provide a reliable and efficient device for apprising the lehr operator or attendant that an article has fallen over as it is deposited on the lehr conveyor or soon thereafter so that such operator or attendant may set the article upright in its proper place on the lehr conveyor before subsequent articles are also caused to fall over.

A further object of the invention is to provide a signal device of the character described which will be operated by the article that has fallen over or upset on the lehr conveyor.

A further object of the invention is to provide an article tipover signal device of the character described which can be quickly and easily applied operatively to a lehr without requiring any substantial change in or addition to the usual structure of the lehr and without interference with the normal operation thereof.

Other objects and advantages of the invention will hereinafter be pointed out or will become apparent from the following description of a practical embodiment of the invention, as shown in the accompanying drawing, in which Fig. 1 is a plan view of the front or ware entering end of a lehr to which an article tipover signal constituting an illustrative example of the present invention has been applied, Fig. 2 is a longitudinal vertical section through the structure shown in Fig. 1, illustrating the manner in which a signal device of the present invention is operated by an article, such as a bottle, as it falls over in a rearward direction after it has been deposited in an upright position on the lehr conveyor.

In the drawing, the front end portion of a lehr 10 for glassware is shown in part. This lehr has a tunnel 11 through which the ware to be annealed is transported by the upper reach of a flexible lehr conveyor 12. This lehr conveyor may be of woven wire construction, as is usual.

As shown, the upper or ware bearing reach of the lehr conveyor is guided and supported at the front of the lehr by a roller 13 and then passes over a substantially flat supporting surface 14 (Fig. 2) to and through the entrance to the lehr tunnel and thence through such tunnel. The entrance to the lehr tunnel may be considered as being the transverse zone beneath the vertically adjustable front door or closure 15. The articles to be annealed, which may be bottles as shown at 16, are loaded onto successive portions of the lehr conveyor just before they pass into the entrance to the lehr tunnel. As stated, this loading in actual practice generally is accomplished by the use of a stacker which distributes successive articles laterally throughout a loading zone at the front of the entrance to the lehr tunnel, the result being that the articles 16 are arranged by the operation of the stacker and the movement of the lehr conveyor in rows which extend longitudinally on the conveyor and are sufficient in number to load the lehr conveyor throughout substantially its entire width. The width of the lehr conveyor may be but slightly less than the full width of the lehr tunnel.

One form of stacker i. e., the Hartford stacker, which is well known in the art and is adapted to effect loading of the conveyor of a lehr equipped with the present invention, is shown and described in detail in Patent No. 1,878,156, granted to Edward H. Lorenz, assignor to Hartford-Empire Company, on September 20, 1932 for Apparatus for handling glassware. As the present invention may be employed advantageously in the operation of lehrs which are loaded by automatic ware handling devices or stackers of any suitable known construction and mode of operation and as a stacker or automatic ware handling device does not, per se, form part of the present invention, no example thereof has been shown in the drawing.

In carrying out the invention, a lehr having a conveyor onto which the articles to be annealed are loaded by an automatic ware handling device or stacker, substantially as described, is provided with a signal actuator, adapted to be actuated by an article that has fallen over after it has been placed upright in its proper position on the portion of the lehr conveyor that then occupies the loading zone in front of the entrance to the lehr tunnel. As applied to the lehr shown in the drawing, the signal actuator comprises a rod like member having a vertically swingable body portion 17 extending substantially the full width of the lehr conveyor and provided at its ends with aligned journal portions 18. These journal portions 18 of the signal actuator are supported in bearings 19 which are adjustably secured in place on side members or rails 20 of the lehr structure or framework. As shown, the bearings 19 are provided with slots 21 through which securing devices 22, which may be screws or cap bolts, extend into the supporting members 20 and maintain the bearing members in adjusted positions on such supporting members. By loosening the fastening devices 22, the bearings 19 may be moved longitudinally on the supporting members 20 toward or away from the entrance to the lehr tunnel so as to position the body 17 of the signal actuating member closer or farther away from the particular places at which the articles are deposited on the lehr conveyor as the stacker distributes them laterally of such conveyor. This adjustment permits positioning of the signal actuator in the most desirable positions at different times for articles of different heights and sizes.

The body 17 of the signal actuator is curved or offset forwardly, i. e., toward the entrance of the lehr tunnel, so as to be movable upwardly and downwardly about a horizontal axis coincident with the axial line of the journals or end portions 18 of such actuator. As shown, the body 17 is curved substantially along an arc corresponding approximately to that along which the depositing members of the Hartford stacker distribute successive articles laterally of a lehr conveyor but this particular shape may be changed or an actuator having a body of a different shape employed without departing from the spirit and scope of the invention.

One of the journals or end portions 18 of the signal actuator may carry a counterweighted arm 23, extending from the axial line of the journals 18 in a direction generally opposite to the bowed or curved body portion 17 of the signal actuator. The counterweighted arm serves to maintain the body of the signal actuator normally at a predetermined level, such, for example, as the horizontal position shown in full lines in Fig. 2. This position of the body of the signal actuator is such that a switch actuating rocker arm 24 that is carried by the other journal or end portion 18 of the signal actuator will then be maintained in position to open a switch 25 for controlling an electric signal operating circuit. This circuit may comprise wires 26, 27 and 28, a source of electric current, such as the battery 29, and an electric signal 30, all as shown diagrammatically in Fig. 1. The electric signal may be a bell or any other known electrical means for producing a desirable audible or visible signal when the signal controlling circuit has been closed.

The illustrated and described practical embodiment of the invention may operate substantially as follows:

An article, such as the bottle shown in dotted lines at 30 in Fig. 2, has been deposited on the lehr conveyor by an associate stacker and has fallen rearwardly onto the movable signal actuating member 17. This movable signal actuator member may be provided with spaced upwardly projecting teeth or fingers, as indicated at 31, to prevent the article from rolling laterally off such member. The weight of the article on the movable signal actuating member will depress the body thereof, as to the position indicated by the dotted lines in Fig. 2, against the weight of the counterweighted arm 23. This movement of the movable actuating member will swing the switch arm 24 as required to close the switch 25. The closing of the electric circuit by this switch will operate the signal 30 so that the lehr operator or attendant will be apprised of the situation and may restore the article that has fallen to its proper upright position. The weight on the counterweighted arm 23 may be adjusted along such arm and is suitably positioned to assure return of the movable signal actuating member upwardly to its initial or normal position after the weight of a fallen article has been removed therefrom while yielding in response to the weight of a fallen article, lying on or against the signal actuating member. The adjustment of the signal actuating member toward or away from the entrance to the lehr tunnel permits appropriate presetting of the device for use with articles of different heights and sizes.

It is to be understood that the invention is not limited to the particular construction shown in the drawing and described in detail in the foregoing specification but extends to all such embodiments thereof as are comprehended by the terms of the appended claims.

What I claim is:

1. An article tipover signal device for a lehr having a conveyor onto which articles to be annealed are deposited in a loading zone adjacent to the entrance of the lehr, comprising a movable actuator located adjacent to said loading zone in position to be actuated by an article tipping or falling over from an upright position on the portion of the conveyor in the loading zone, and means operated in response to the actuation of said actuator by said article to produce a signal adequate to apprise a lehr attendant that said article has fallen over.

2. An article tipover signal device for a lehr having a conveyor onto which articles to be annealed are deposited in a loading zone adjacent to the entrance of the lehr, comprising a pivoted actuator extending over a portion of the conveyor adjacent to said loading zone in position to be rocked about its pivotal axis by the contact therewith of an article tipping or falling over from an upright position on the adjacent portion of said conveyor, and means operated in response to the rocking of said pivoted actuator about its pivotal axis by said article to produce a signal to a lehr attendant to apprise him that said article has fallen over from its upright position on the conveyor.

3. An article tipover signal device for a lehr having a conveyor onto which articles to be annealed are deposited in a loading zone adjacent to the entrance of the lehr, comprising an actuator having a movable body portion extending transversely across the conveyor adjacent to and at the front of the loading zone and adapted to be moved by an article that has been deposited on an adjacent portion of the conveyor when such article falls from an upright position against said actuator, and means operated in response to the movement of said actuator by said article for giving a signal to apprise a lehr attendant of the falling or upsetting of the article.

4. An article tipover signal device for a lehr having a conveyor onto which articles to be annealed are deposited in a loading zone adjacent to the entrance of the lehr, comprising an actuator having aligned journals rotatably supported at the sides of the conveyor adjacent to and in front of the loading zone and having a forwardly projecting movable body portion extending transversely across the space above the conveyor in position to be struck by an article on the conveyor in the loading zone when such article falls over or upsets in the direction of the actuator, a signal giving mechanism, and normally inactive means operated by the movement of the body portion of said actuator by an article falling or upsetting into contact therewith for operating said signal giving mechanism.

5. An article tipover signal device for a lehr having a conveyor onto which articles to be annealed are deposited in a loading zone adjacent to the entrance of the lehr, comprising a movable actuator extending transversely of the lehr conveyor adjacent to and in front of the loading zone and slightly above the lehr conveyor, said actuator being adjustable bodily toward and from the loading zone and adapted when in any adjusted position to be moved by an article falling thereagainst after such article has been placed upright on the portion of the conveyor in the loading zone, a normally open electric switch, means actuated by the movement of said movable actuator when an article falls thereagainst to close said switch, an electrical mechanism for producing an audible signal, and a circuit controlled by said switch for operating said electrical mechanism.

6. An article tipover signal device for a lehr having a conveyor onto which articles to be annealed are deposited in a loading zone adjacent to the entrance of the lehr, comprising bearings adjustably supported at the sides of the conveyor belt adjacent to said loading zone and adjustable toward and from said loading zone, an actuator comprising a rod like member having aligned journal portions supported by said bearings and having a forwardly curved body portion supported above said conveyor and adjacent thereto, said curved portion extending from the axial line of the journal portions of said actuator toward said loading zone and being located in position to be struck by an article on the portion of the conveyor in said loading zone when said article falls over or upsets toward the actuator, a counterweighted arm extending from one of said journals in the direction opposite said curved body portion of the actuator for maintaining said curved body portion of the actuator normally at a predetermined height above the conveyor and for yielding in response to the weight of said article on said body portion of the actuator, a switch actuating arm carried by one of the journal portions of said actuator, a normally open switch closed by said switch actuating arm in respect to the movement of the body portion of said actuator when the latter is swung downwardly by an article falling over onto it, and an electrical signal mechanism operatively connected with said switch so as to be operated when the switch is closed.

7. An article tipover signal device for a lehr having a conveyor onto which articles to be annealed are deposited in a loading zone adjacent to the entrance of the lehr, comprising bearings adjustably supported at the sides of the conveyor belt adjacent to said loading zone and adjustable toward and from said loading zone, an actuator comprising a rod like member having aligned journal portions supported by said bearings and having a forwardly curved body portion supported above said conveyor and adjacent thereto, said curved body portion of the actuator having upstanding spaced projections thereon for engaging with the portion of an article that falls thereagainst from an upright position on the adjacent portion of said conveyor to prevent said article from rolling out of contact with said actuator, and means operable in response to the movement of the body of said actuator by said article to produce a signal for apprising a lehr attendant that said article has been upset.

CLARENCE F. BIRD.